(12) United States Patent
Dickinson

(10) Patent No.: US 12,208,866 B2
(45) Date of Patent: Jan. 28, 2025

(54) WATER VESSEL TOWING DEVICE

(71) Applicant: Kevin Eugene Dickinson, Huntington Beach, CA (US)

(72) Inventor: Kevin Eugene Dickinson, Huntington Beach, CA (US)

(*) Notice: Subject to any disclaimer, the term of this patent is extended or adjusted under 35 U.S.C. 154(b) by 334 days.

(21) Appl. No.: 17/984,712

(22) Filed: Nov. 10, 2022

(65) Prior Publication Data
US 2024/0101227 A1   Mar. 28, 2024

Related U.S. Application Data

(60) Provisional application No. 63/280,130, filed on Nov. 16, 2021.

(51) Int. Cl.
| | |
|---|---|
| *B63H 21/21* | (2006.01) |
| *B63B 21/20* | (2006.01) |
| *B63B 21/56* | (2006.01) |
| *B63H 21/17* | (2006.01) |
| *B63H 25/02* | (2006.01) |
| *G05D 1/00* | (2006.01) |

(52) U.S. Cl.
CPC .............. *B63B 21/56* (2013.01); *B63B 21/20* (2013.01); *B63H 21/17* (2013.01); *B63H 21/21* (2013.01); *B63H 25/02* (2013.01); *G05D 1/0016* (2013.01); *G05D 1/0022* (2013.01); *G05D 1/0206* (2013.01); *B63H 2021/216* (2013.01); *B63H 2025/028* (2013.01)

(58) Field of Classification Search
CPC ......... B63B 21/20; B63B 21/56; B63H 21/17; B63H 21/21; B63H 25/02; B63H 2021/216; B63H 2025/028
See application file for complete search history.

(56) References Cited

U.S. PATENT DOCUMENTS

| | | | | |
|---|---|---|---|---|
| 3,850,130 | A | * 11/1974 | Heuschober | ............ B63B 34/63 200/61.47 |
| 5,041,040 | A | * 8/1991 | Jones | ..................... B63H 21/22 114/253 |
| 5,167,550 | A | * 12/1992 | Nielsen | ................... B63B 34/60 440/85 |

(Continued)

OTHER PUBLICATIONS

Efoil. Builders website forum, downloaded from the Internet at https://foil.zone/t/valhalla-s-tow-boogie-ebuild/11059.

*Primary Examiner* — Dale Moyer
(74) *Attorney, Agent, or Firm* — QuickPatents; Kevin Prince

(57) ABSTRACT

A towing device for a rider on a body of water comprises a buoyant platform having at least one electric motor and a prop. A container fixed with the towing device contains a controller to power each electric motor. A wireless remote control sends wireless commands to the controller. A tow rope is fixed with the buoyant platform proximate the rear end. As such, with the rider holding the wireless remote control and engaged with a distal end of the two rope, commands from the wireless remote control are sent to the controller to control power to each electric motor. Preferably the towing device further includes a pivotable rudder that is disposed behind the prop, or a steering nozzle, and the wireless remote control has a steering control to send steering signals to the controller. Various modes of operation of the towing device are disclosed.

12 Claims, 12 Drawing Sheets

(56) References Cited

U.S. PATENT DOCUMENTS

| | | |
|---|---|---|
| 6,269,763 B1 | 8/2001 | Woodland |
| 6,558,218 B1 | 5/2003 | Hansen |
| 6,854,406 B2 | 2/2005 | Cardoza |
| 7,398,741 B2 | 7/2008 | Koda |
| 8,882,555 B2 | 11/2014 | Mulligan |
| 9,017,123 B2 | 4/2015 | Szydlowski |
| 9,278,737 B2 | 3/2016 | Freeman |
| 9,616,984 B2 | 4/2017 | Peddie |
| 9,896,162 B2 | 2/2018 | McClure |
| 9,969,478 B2 | 5/2018 | Mazin |
| 10,011,337 B2 | 7/2018 | MacCready |
| 10,048,689 B2 | 8/2018 | Arisumi |
| 10,518,847 B2 | 12/2019 | Dudley |
| 10,668,990 B2 | 6/2020 | Sheldon-Coulson |
| 10,732,296 B1 | 8/2020 | Morin |
| 10,836,457 B2 | 11/2020 | Geislinger |
| 10,875,613 B2 | 12/2020 | Vining |
| 10,940,917 B2 | 3/2021 | Montague |
| 10,988,252 B2 | 4/2021 | Henry |
| 11,008,076 B2 | 5/2021 | Gordon, II |
| 11,104,410 B2 | 8/2021 | Kester |
| 2003/0167991 A1 | 9/2003 | Namanny |
| 2005/0124234 A1* | 6/2005 | Sells ............... B63H 25/02 440/33 |
| 2007/0096948 A1 | 5/2007 | La Barbera |
| 2011/0256518 A1 | 10/2011 | Rott |
| 2012/0060738 A1* | 3/2012 | Sells ............... B63H 21/22 114/144 A |
| 2016/0280351 A1* | 9/2016 | Ito .................. B63B 34/60 |
| 2017/0308089 A1 | 10/2017 | Connor |
| 2019/0031299 A1 | 1/2019 | Bangslund |
| 2019/0263484 A1 | 8/2019 | Wilson |
| 2020/0339232 A1 | 10/2020 | Lu |
| 2021/0147041 A1 | 5/2021 | Weisenburger |
| 2021/0197938 A1 | 7/2021 | Brisard |
| 2023/0227129 A1* | 7/2023 | Jones ............... B63B 32/10 114/55.5 |

\* cited by examiner

WATER VESSEL TOWING DEVICE

CROSS-REFERENCE TO RELATED APPLICATIONS

This application claims the benefit of U.S. Provisional Patent Application 63/280,130, filed on Nov. 16, 2021, and is incorporated herein by reference.

STATEMENT REGARDING FEDERALLY SPONSORED RESEARCH AND DEVELOPMENT

Not Applicable.

FIELD OF THE INVENTION

This invention relates to towing devices, and more particularly to a towing device for a rider on a hydrofoil apparatus or the like.

BACKGROUND

Hydrofoil boards for surfing are becoming more popular, and as with other surfing devices it is often helpful for a rider to be towed into a wave for effectively catching the wave. Kite sails and jet skis can be used to aid a rider to catch waves, but jet skis require a second person to man the jet ski, and kite sails once utilized must be held by the rider in such a way as not to disrupt the ride due to air currents, which is difficult and takes one hand to hold the kite sail.

Therefore, there is a need for an unmanned device that can respond to control signals of the rider to aid the rider in catching waves, and for returning to the rider after the rider has rode a wave. Such a needed invention would have a relatively low weight and would be easily carried. The needed device would provide means for repositioning at a rendezvous position after the rider has caught the wave and let go of a tow rope. Further, such a needed invention could be used by multiple riders each having their own remote control, and would provide a means of staying out far enough into the body of water to reduce the chance of getting caught in rough surf itself. The present invention accomplishes these objectives.

SUMMARY OF THE INVENTION

The present device is a towing device for a rider on a body of water, such as a lake or ocean. The rider may be utilizing preferably a hydrofoil board, or may be using a surfboard, a boogie board, or the like.

The towing device comprises a buoyant platform having a top side, a bottom side, and a peripheral edge that includes at least a rear end and a front end. The buoyant platform may also take the shape of a boat hull, a boogie-board, or other water vessel.

At least one electric motor and a prop are fixed with the bottom side of the buoyant platform and are adapted to propel the buoyant platform on the body of water. The at least one electric motor spins the prop when active, and is mounted to the bottom side of the buoyant platform preferably with an aquadynamic mast.

A container has an internal space and is fixed with the top side of the buoyant platform. In some embodiments, the container includes a lid movable between an open configuration and a closed configuration. The lid when in the closed configuration forms a water-tight seal such that water is inhibited from entering the internal space of the container.

A controller is disposed within the internal space of the container and has at least a power source, a CPU, a non-volatile memory, a volatile memory, a motor driver, and a wireless module for receiving wireless commands from a wireless remote control. The controller is adapted to power the at least one electric motor with the motor driver, and is connected to the at least one electric motor with a plurality of electric cables. The power source is preferably a rechargeable battery. The wireless remote control preferably includes, preferably, a trigger throttle control, a battery, and preferably a CPU, a memory, and a wireless module for sending wireless commands to the controller.

A tow rope mount is fixed with the top side of the buoyant platform proximate the rear end and is adapted to engage a proximal end of a tow rope. As such, with the rider holding the wireless remote control and engaged with a distal end of the tow rope, which preferably terminates at a handle, commands from the wireless remote control are sent to the wireless module of the controller to control power to the electric motor.

Preferably the towing device further includes a pivotable rudder that is disposed behind the prop. The pivotable rudder is controlled by a steering actuator connected with the controller. In such an embodiment, the wireless remote control has a steering control and is adapted to send steering signals from the steering control to the controller to cause the controller to pivot the rudder in accordance with the steering signals. The controller may further include a rudder actuator driver to power the rudder actuator. In some embodiments, the at least one electric motor takes the form of a jet drive, and the pivotable rudder takes the form of a steering nozzle, as is known in the art.

In preferred embodiments of the invention, the controller further includes a location sensor, such as a GPS module. Further, the wireless remote control includes a rendezvous position set button. A rendezvous position is saved in the volatile memory of the controller when the rendezvous position set button is actuated. As such, if the rider is towed into a wave, for example, and releases the tow rope and commands the controller to stop the electric motor, the controller steers the towing device back to the rendezvous position utilizing the at least one electric motor and the rudder, at which point the at least one electric motor is deactivated while the controller awaits further commands from the wireless remote control.

In preferred embodiments of the invention, the wireless remote control further includes a location sensor, such as a GPS module, and a follow-me button. When the follow-me button is actuated, the wireless remote control transmits the location of the wireless remote control (and by extension the rider) to the controller of the towing device, whereupon the controller of the towing device uses the at least one electric motor and the rudder to maintain a predetermined safe distance, such as fifty feet for example, away from the wireless remote control and the rider.

In embodiments of the invention that include the pivotable rudder, preferably the wireless remote control includes a rocker switch wherein left and right movement of the rocker switch results in left and right steering of the towing device, respectively.

In preferred embodiments of the invention, at least one additional wireless remote control is included for at least one additional rider. The controller electrically attaches to one of the wireless remote controls, until a predetermined period of time has passed since a last command therefrom, such as thirty seconds for example. The controller then engages the next wireless remote control, to send commands, whereby the rider and the additional riders can alternate use of the towing device in a common area of the body of water.

The present invention is an unmanned device that can respond to control signals of the remote control held by the rider to aid the rider in catching waves. The present device has a relatively low weight, is easily carried, and provides means for repositioning at a rendezvous position after the rider has caught the wave and let go of the tow rope. Further, the present invention can be shared by multiple riders each having their own remote control, and provides a means of staying out far enough into the body of water to reduce the chance of getting caught in rough surf itself. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
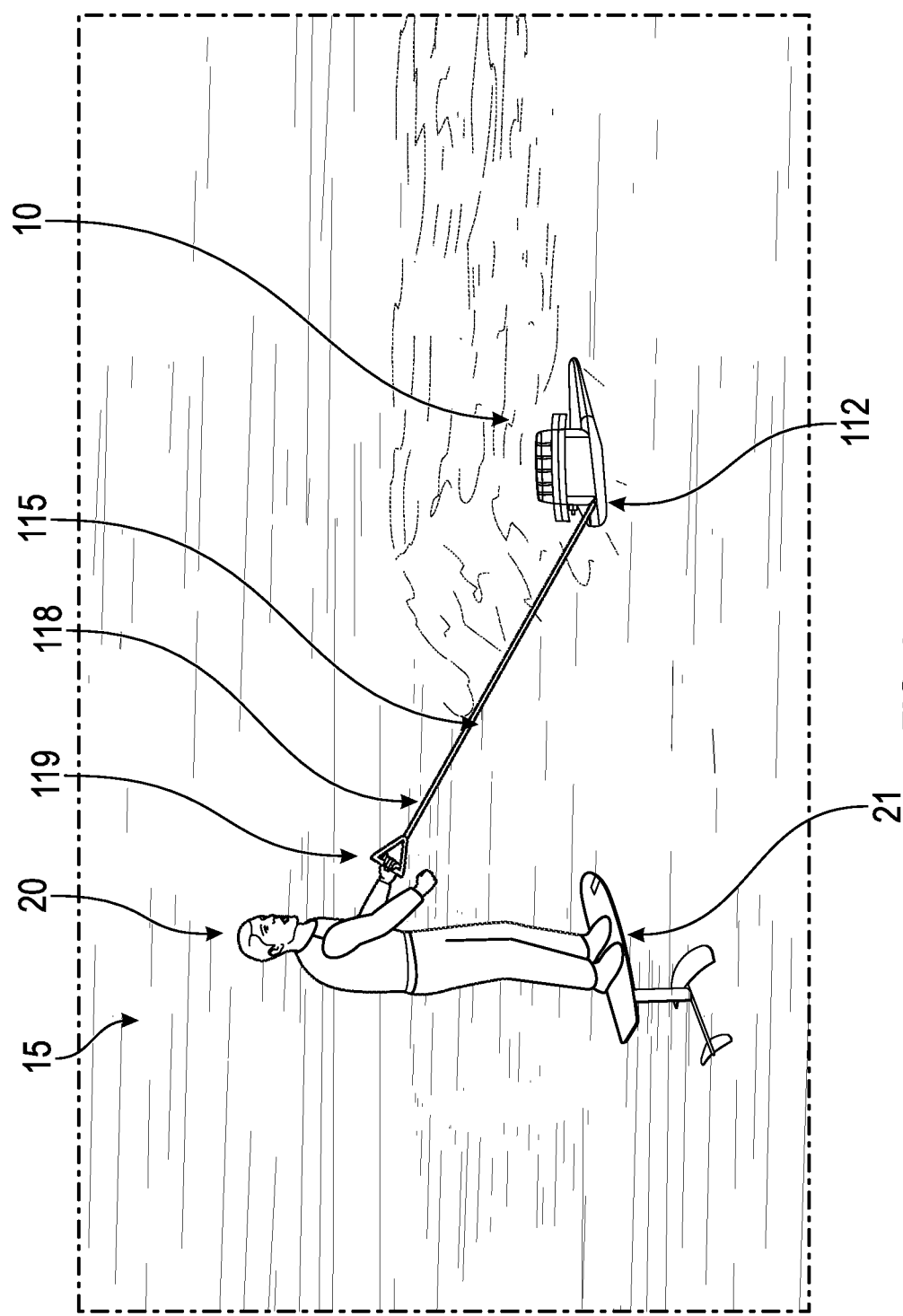
FIG. 1 is a perspective view of the invention, illustrating a towing device pulling a rider on a body of water with a tow rope.
Figure 2:
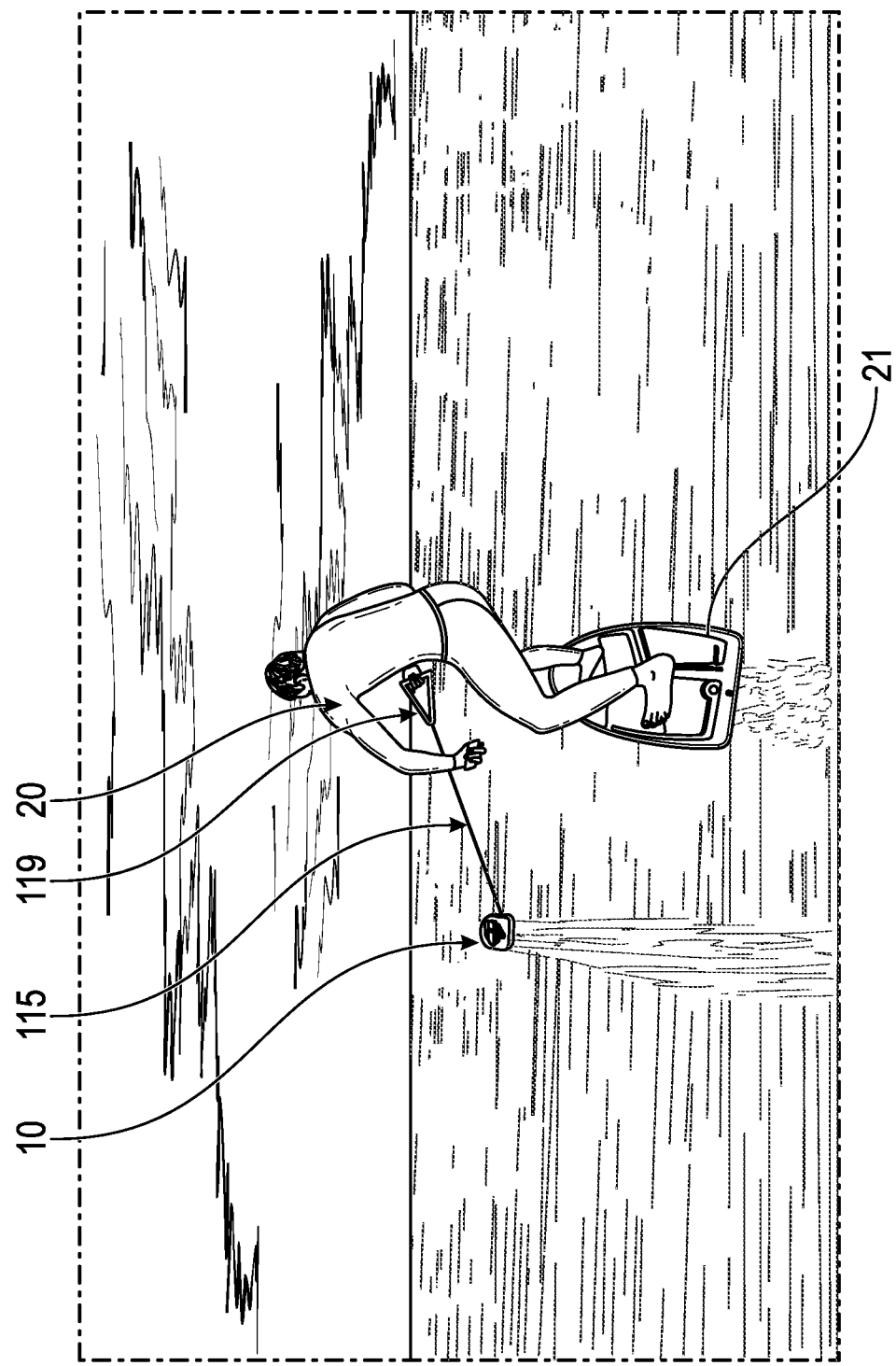
FIG. 2 is a rear perspective view thereof.
Figure 3:
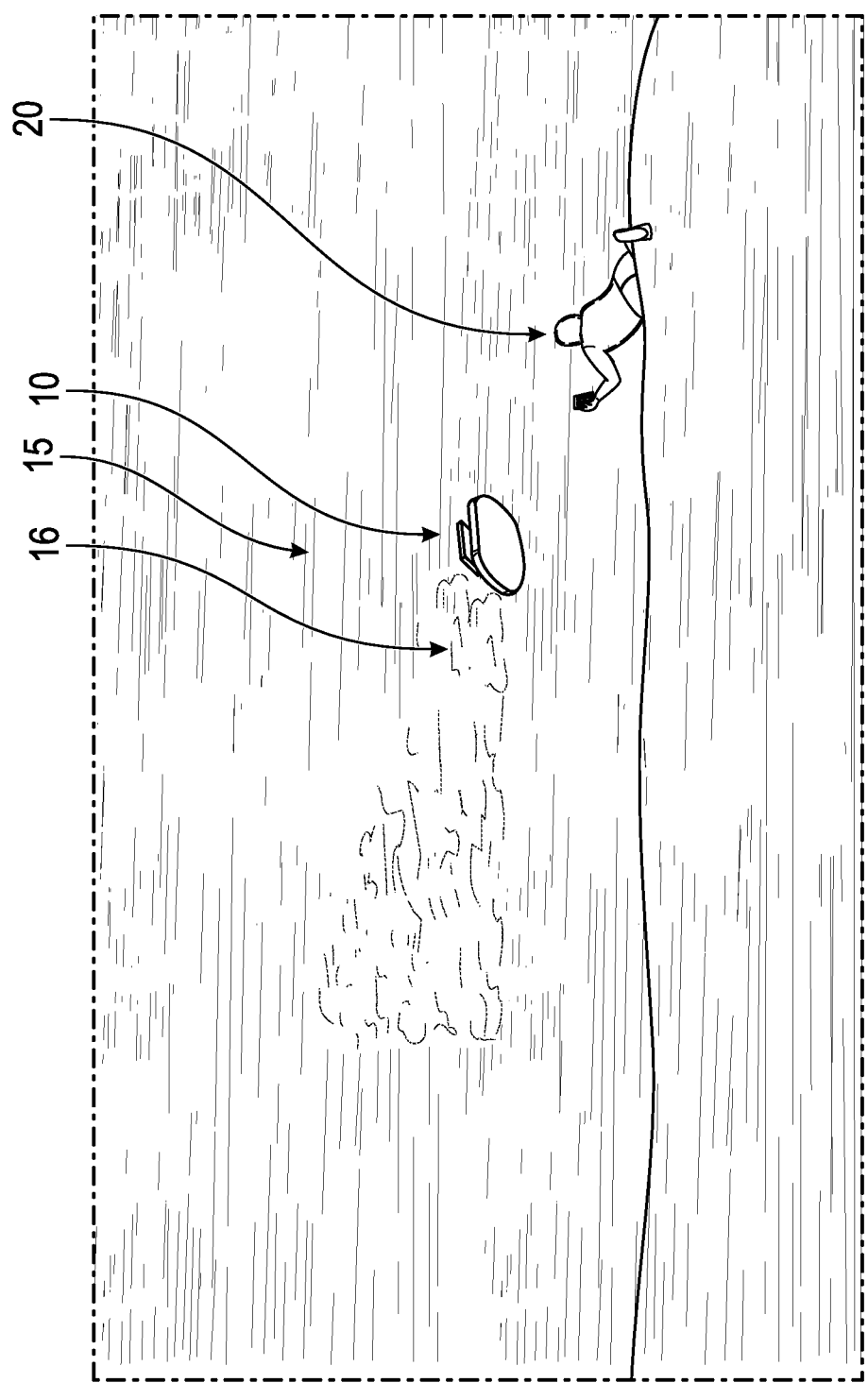
FIG. 3 is a perspective view of the invention, illustrating the towing device approaching the rider through the use of a remote control.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

FIGS. 1-3 and 10 illustrate a towing device 10 for a rider 20 on a body of water 15, such as a lake or ocean. The rider 20 may be utilizing preferably a low-drag hydrofoil board 21, or with a stronger towing device 10 a surfboard (not shown), a boogie board (not shown), or the like.

The towing device 10 comprises a buoyant platform 30 having a top side 39 (FIGS. 4 and 5), a bottom side 31 (FIGS. 6A, 6B), and a peripheral edge 35 that includes at least a rear end 38 and a front end 32. In some embodiments the buoyant platform 30 is shaped to be self-righting if capsized, having an open space therein for a container 60 that holds a controller 100, and optionally a weight (not shown) fixed at the bottom side 31 for aiding in self-righting, as is known in the art. In the embodiments shown, however, the buoyant platform 30 resembles a buoyant board. The buoyant platform 30 may also take the shape of a boat hull (not shown) or other water vessel (FIG. 11).

Figure 6A:
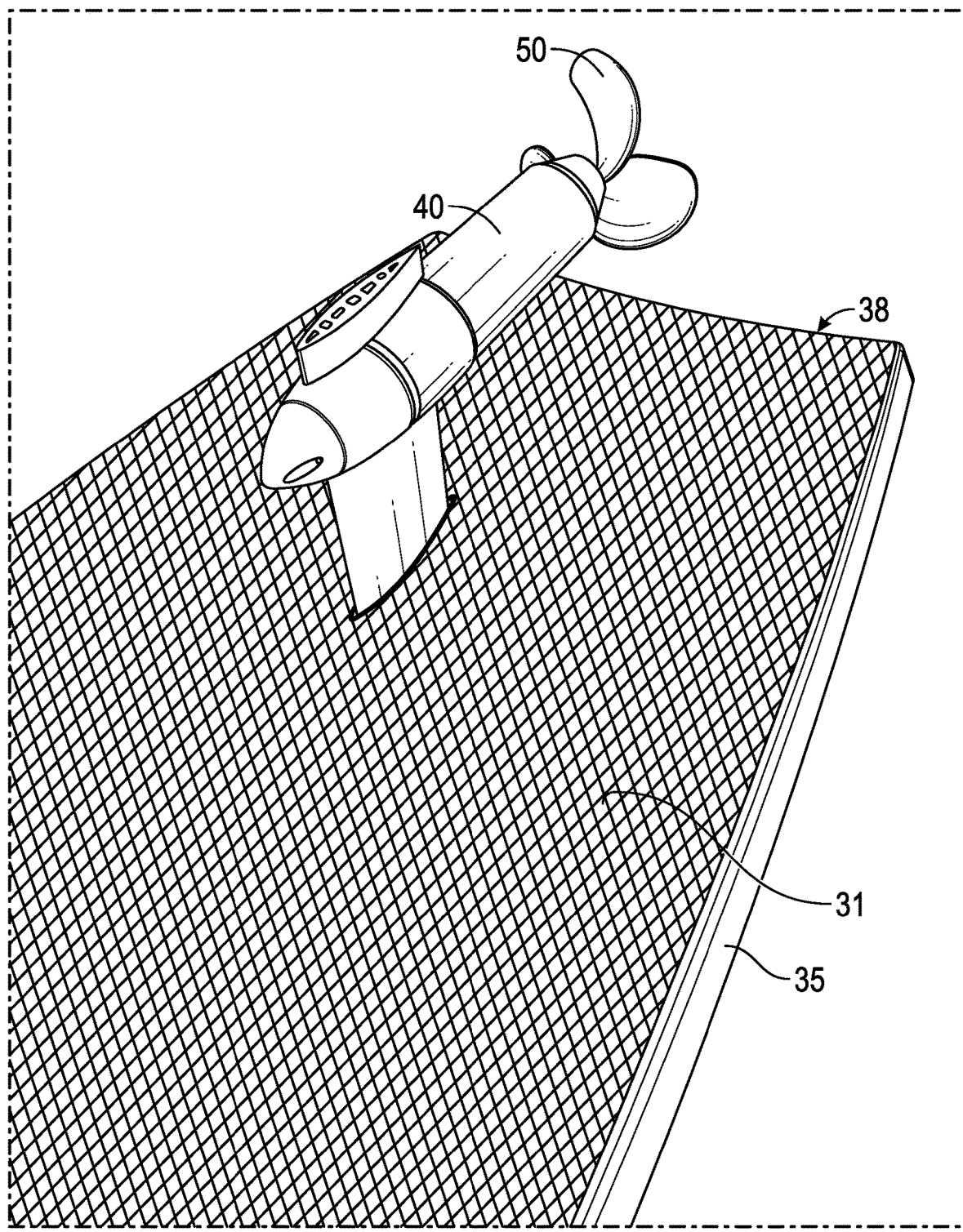
FIG. 6A is a partial bottom perspective view of the invention.
Figure 9A:
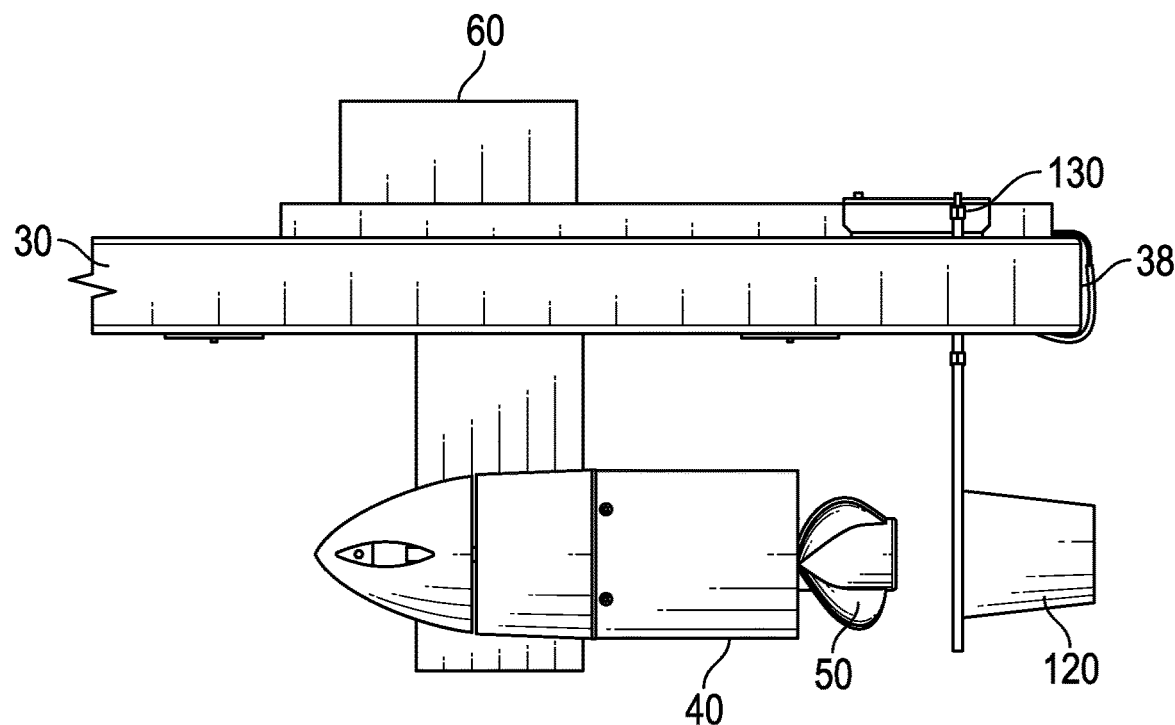
FIG. 9A is a side elevational diagram of the invention.

At least one electric motor 40 each with a prop 50 are fixed with the bottom side 31 of the buoyant platform 30 and are adapted to propel the buoyant platform 30 on the body of water 15. The at least one electric motor 40 spins the prop 50 when active, and is mounted to the bottom side 31 of the buoyant platform 30 preferably with an aquadynamic mast 41 (FIGS. 6A and 9A).

Figure 4:
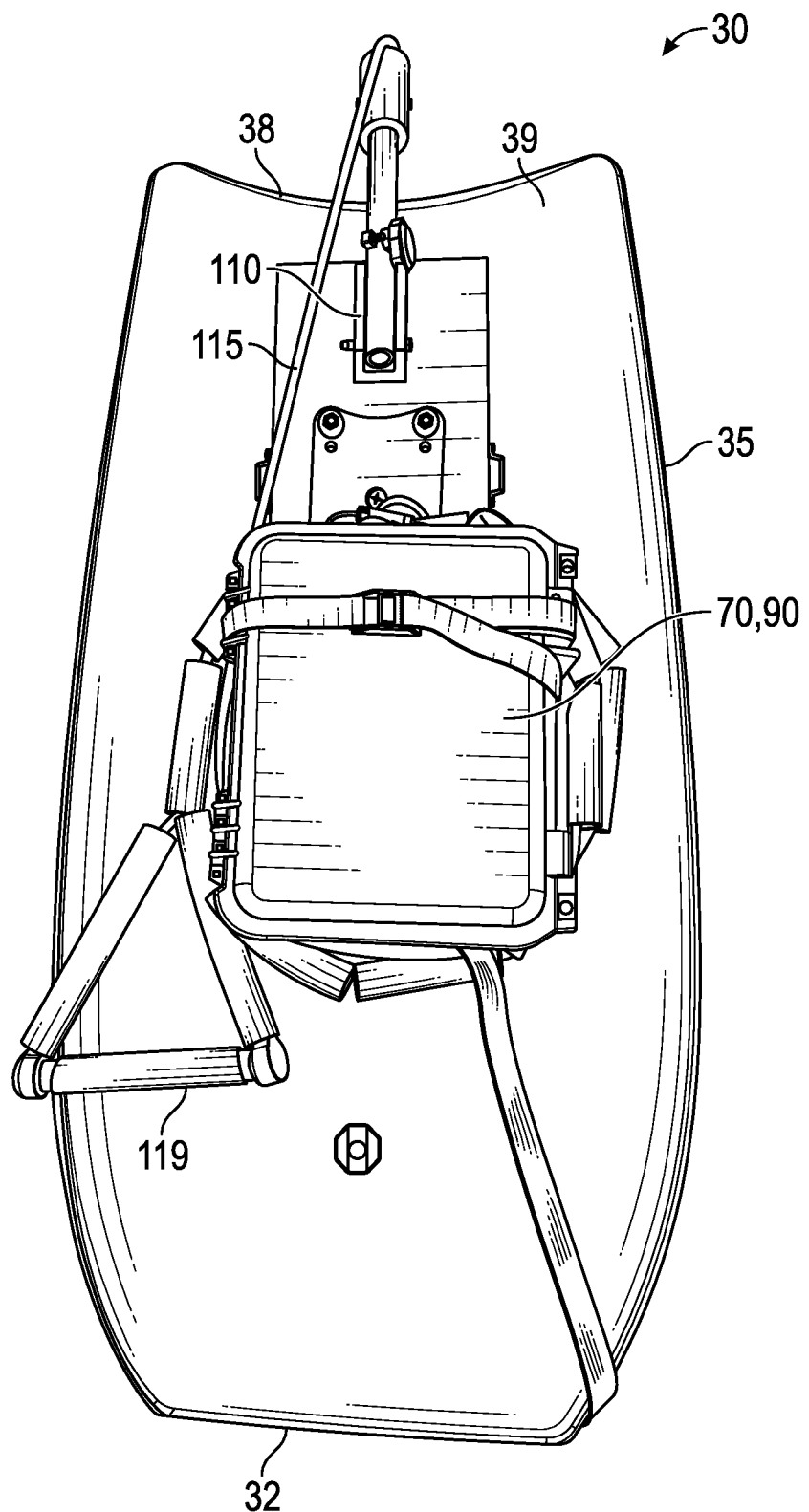
FIG. 4 is a top plan view of the invention, illustrating a container of the invention in a closed configuration.
Figure 5:
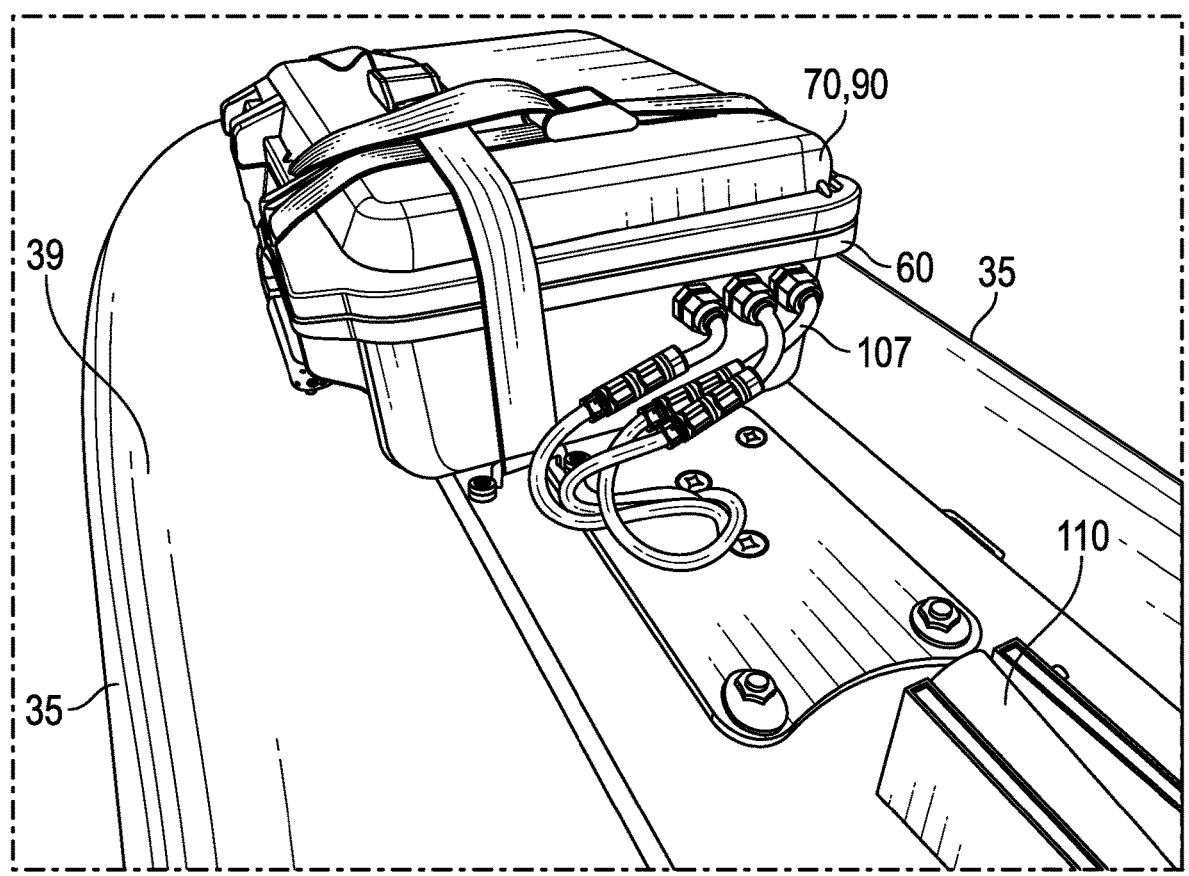
FIG. 5 is a partial top perspective view of the invention.
Figure 6B:
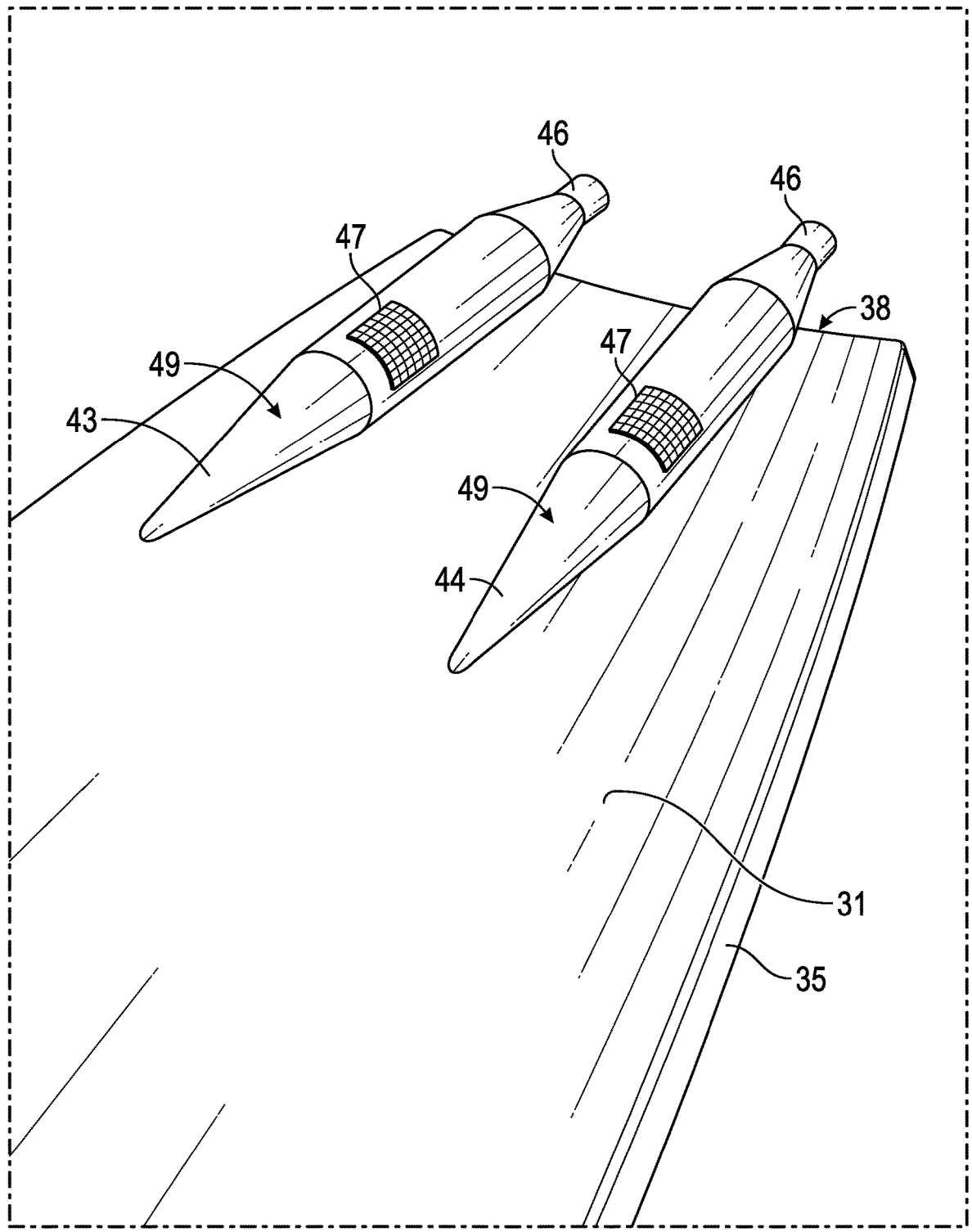
FIG. 6B is a partial bottom perspective view of another embodiment of the invention.
Figure 11:
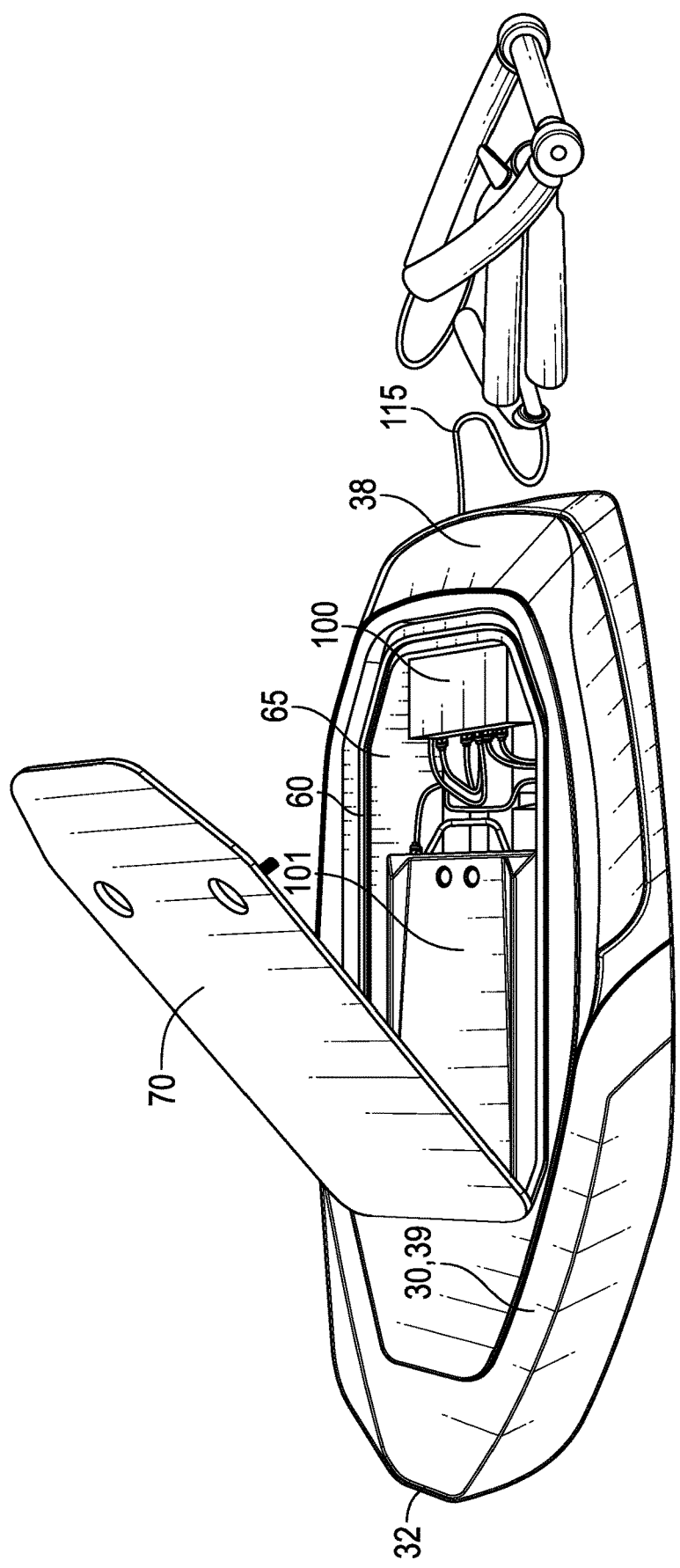
FIG. 11 is a perspective view of an alternate embodiment of the invention, wherein the container is built within a buoyant platform of the invention.

The container 60 has an internal space 65 (FIG. 7) and is fixed with the top side 39 of the buoyant platform 30 (FIGS. 4, 5 and 7) or within the buoyant platform 30 (FIG. 11). In some embodiments, the container 60 includes a lid 70 movable between an open configuration 80 and a closed configuration 90 (FIGS. 4, 5, and 11). The lid 70 when in the closed configuration 90 forms a water-tight seal such that water is inhibited from entering the internal space 65 of the container 60.

Figure 7:
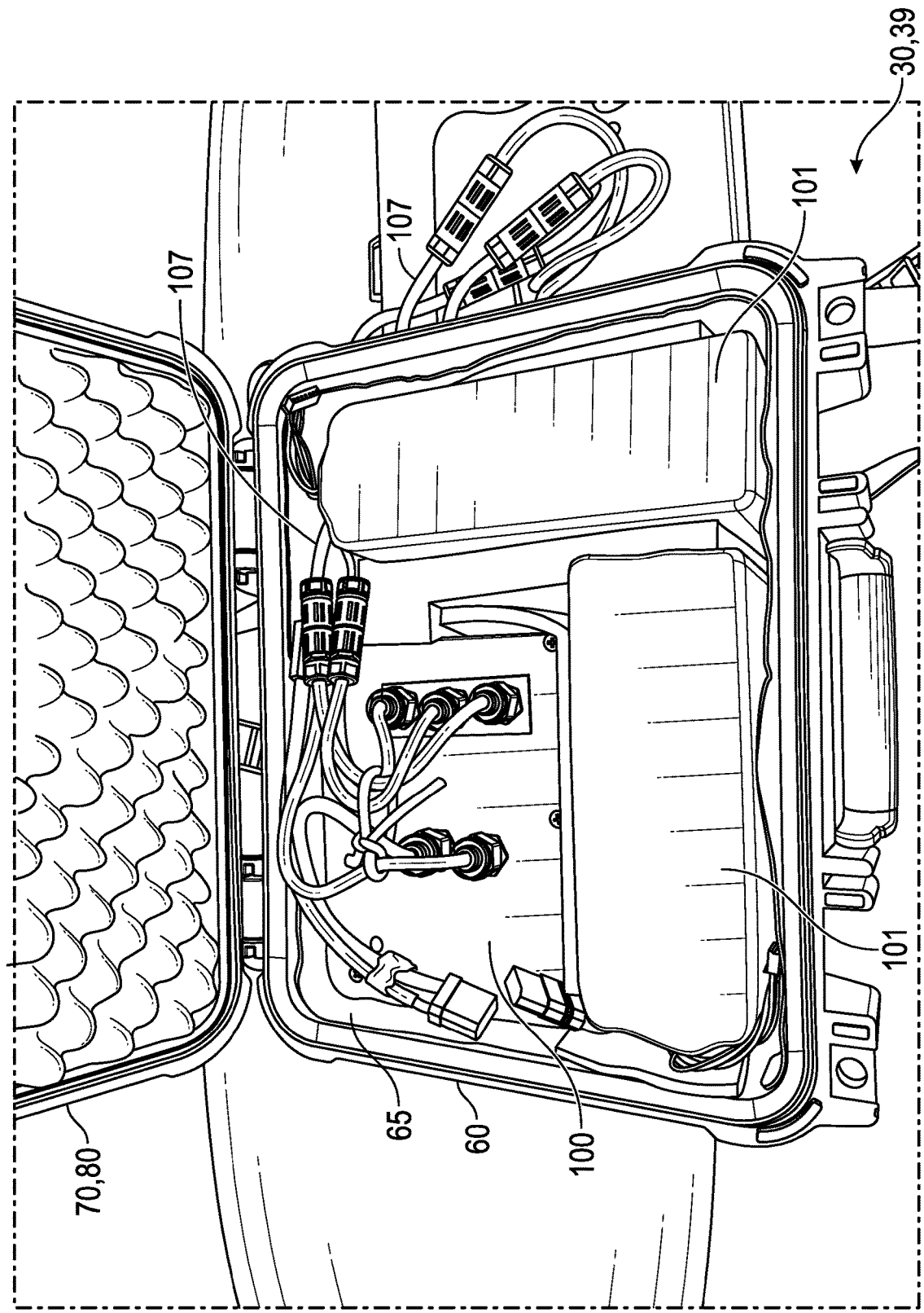
FIG. 7 is a perspective view of the container of the invention in an open configuration.
Figure 8:
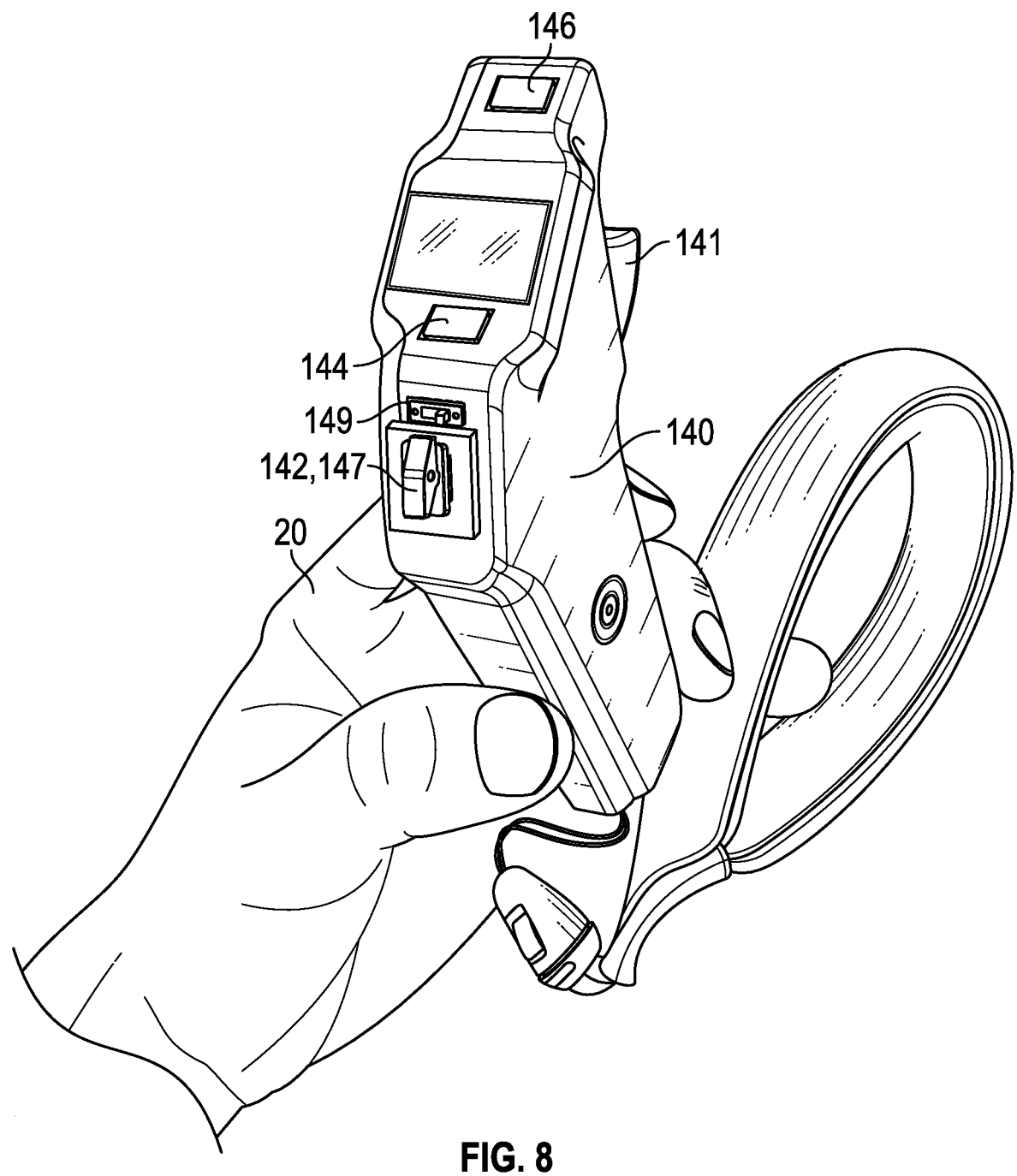
FIG. 8 is a perspective view of the remote control of the invention.

The controller 100 (FIGS. 7 and 10) is disposed within the internal space 65 of the container 60 and has at least a power source 101, a CPU 102, a non-volatile memory 103, a volatile memory 104, a motor driver 105, and a wireless module 106 for receiving wireless commands from a wireless remote control 140 (FIG. 8). The controller 100 is adapted to power the at least one electric motor 40 with the motor driver 105, and is connected to the at least one electric motor 40 with a plurality of electric cables 107. The power source 101 is preferably a rechargeable battery.

The wireless remote control 140 preferably includes, preferably, a trigger throttle control 141 (FIGS. 8 and 10), a battery 148, and preferably a CPU 161, a memory 162, and a wireless module 163 for sending wireless commands to the controller 100. The wireless remote control 140 may utilize any suitable wireless protocol, such as Bluetooth, long range Bluetooth beacon technology, Wi-Fi, simple RF, or other suitable protocol.

A tow rope mount 110 is fixed with the top side 39 of the buoyant platform 30 proximate the rear end 38, or with the rear end 38 (FIG. 11), and is adapted to engage a proximal end 112 of a tow rope 115. As such, with the rider 20 holding the wireless remote control 140 and engaged with a distal end 118 of the tow rope 115, which preferably terminates at a handle 119 (FIG. 4), commands from the wireless remote control 140 are sent to the wireless module 106 of the controller 100 to control power to the at least one electric motor 40.

Preferably, the at least one electric motor 40 includes a port side electric motor 43 (FIG. 6B) and a starboard side electric motor 44, each laterally mutually adjacent, wherein steering of the towing device 10 is controlled by the controller 100 modulating power to each motor 43,44, the wireless remote control 140 having a steering control 142 and adapted to send steering signals from the steering control 142 to the controller 100 to cause the controller 100 to modulating power to each of the electric motors 43,44 in accordance with the steering signals, wherein when the controller 100 sends more power to the port side electric motor 43 than to the starboard side electric motor 44 the towing device 10 is steered to the right, and when the controller 100 sends more power to the starboard side electric motor 44 than to the port side electric motor 43 the towing device 10 is steered to the left.

Figure 9B:
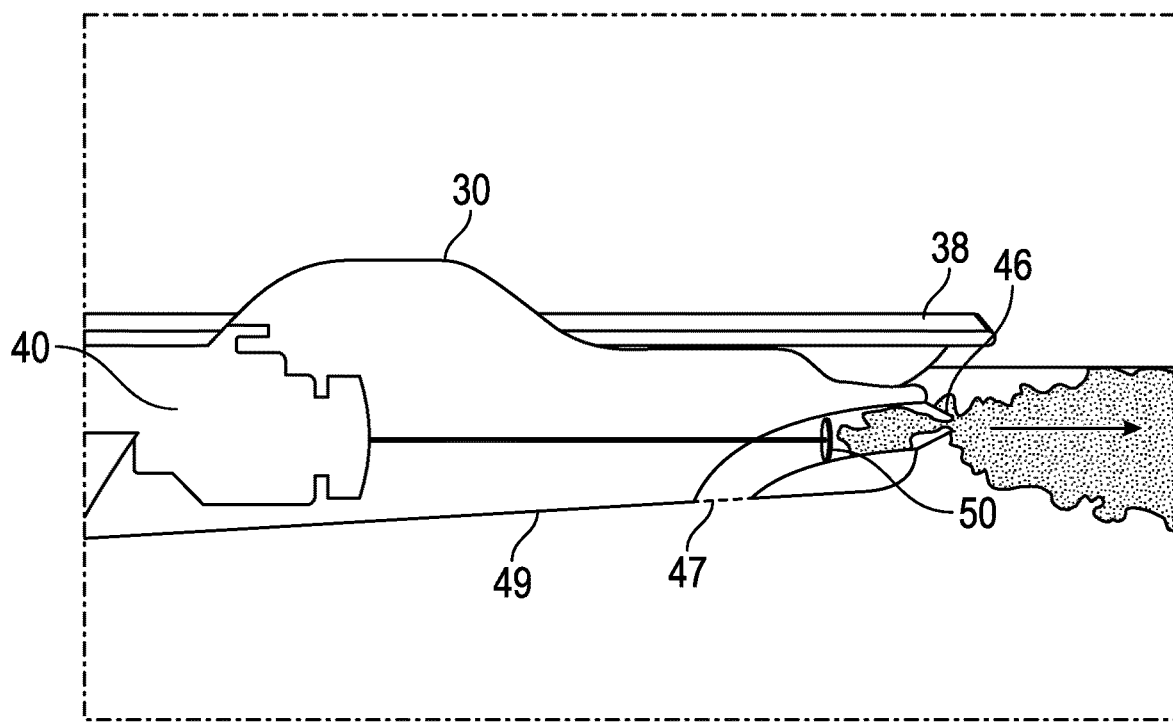
FIG. 9B is a side elevational diagram of an alternate embodiment of the invention.
Figure 10:
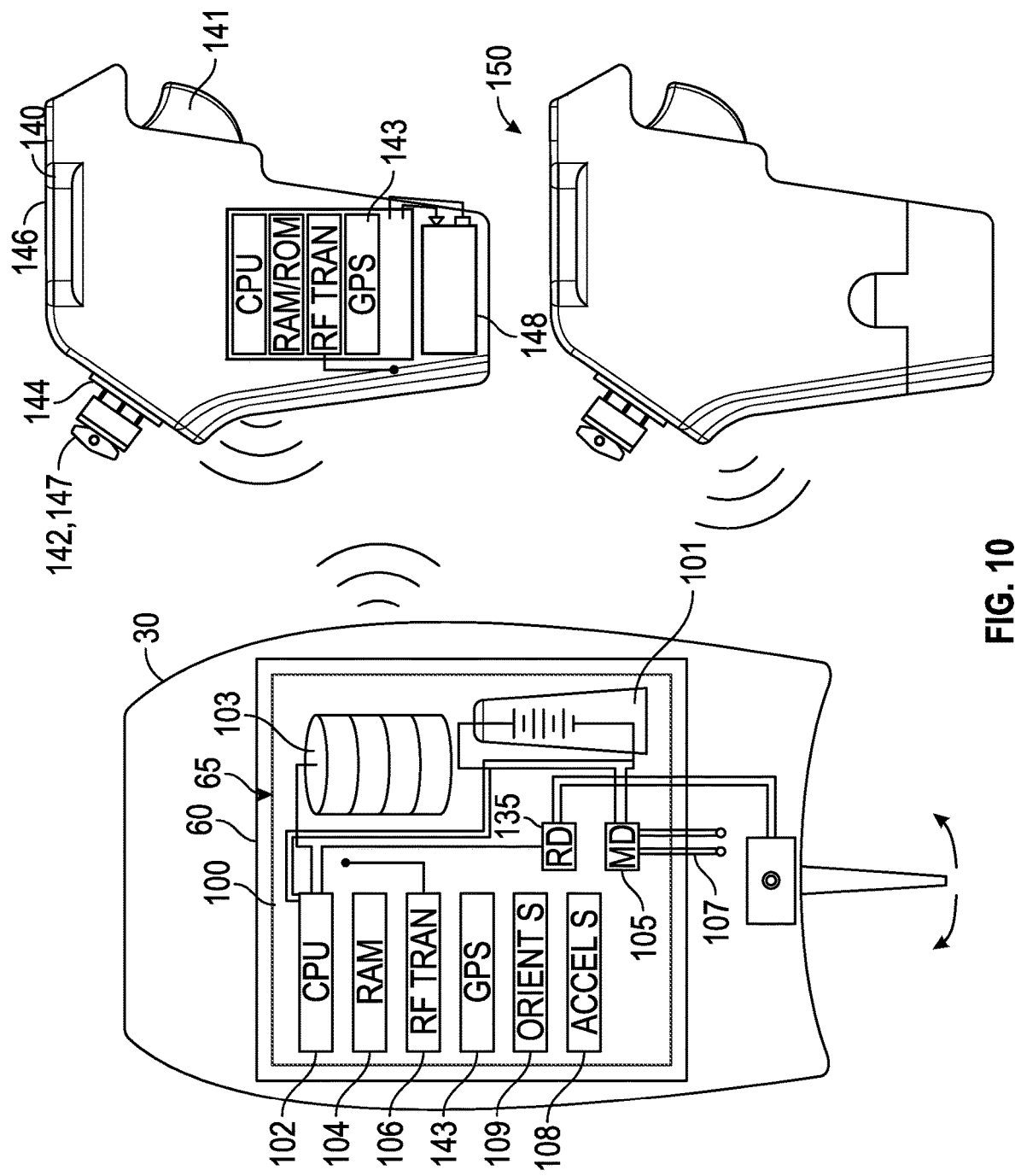
FIG. 10 is a system diagram of the invention.

In some embodiments, the towing device 10 further includes a pivotable rudder 120 (FIGS. 9A and 10) that is disposed behind the prop 50. The pivotable rudder 120 is controlled by a steering actuator 130 connected with the controller 100. In such an embodiment, the wireless remote control 140 has a steering control 142 and is adapted to send steering signals from the steering control 142 to the controller 100 to cause the controller to pivot the rudder 120 in accordance with the steering signals. The controller 100 may further include a rudder actuator driver 135 to power the steering actuator 130. In some embodiments, the at least one electric motor 40 takes the form of a jet drive 49 (FIGS. 6B and 9B), and the pivotable rudder 120 takes the form of a steering nozzle 46, as is known in the art. Such a jet drive 49 includes a water intake 47 and provides for the prop 50 being disposed internally within the jet drive 49 for safety. The steering nozzle 46 of such a jet drive 49 may be moveable for direct steering, or the controller 100 can modules power to the two electric motors 43,44 to effect steering of the tow device 10, or both.

Preferably the controller 100 includes at least one accelerometer 108 and at least one orientation sensor 109. In such an embodiment the controller 100 is adapted to slow the at least one electric motor 40 if the accelerometer 108 detects vertical position fluctuations of the towing device 10 of over a predetermined value. The controller 100 is further adapted to stop the at least one electric motor 40 if the at least one orientation sensor 109 detects that the towing device 10 has capsized.

In preferred embodiments of the invention, the controller 100 further includes a location sensor 143, such as a GPS module. Further, the wireless remote control 140 includes a rendezvous position set button or function 144. A rendezvous position 16 (FIG. 1) is saved in the volatile memory 104 of the controller 100 when the rendezvous position set button or function 144 is actuated. As such, if the rider 20 is towed into a wave, for example, and releases the tow rope 115 and commands the controller 100 to stop the at least one electric motor 40, the controller 100 steers the towing device 10 back to the rendezvous position 16 utilizing the at least one electric motor 40 and its rudder 120 or steering nozzle 46, at which point the at least one electric motor 40 is deactivated while the controller 100 awaits further commands from the wireless remote control 140.

In preferred embodiments of the invention, the wireless remote control 140 further includes a location sensor 145, such as a GPS module, and a follow-me button or function 146 (FIG. 7). When the follow-me button or function 146 is actuated, the wireless remote control 140 transmits the location of the wireless remote control 140 (and the rider 20) to the controller 100 of the towing device 10, whereupon the controller 100 of the towing device 10 uses the at least one electric motor 40 and the rudder 120 to maintain a predetermined safe distance, such as fifty feet for example, away from the wireless remote control 140 and the rider 20.

The rider 20 may further provide the controller 100 with a preferred direction for the towing device 10 to maintain the safe distance, such as by actuating the follow-me button 146 twice to form a direction line 160 (FIG. 3), the direction line 160 representing a direction away from the wireless remote control 140 for the towing device 10 to maintain while keeping away from the wireless remote control 140 by the safe distance. Optionally, the wireless remote control 140 may be used to indicate a surf line 165 that the towing device 10 does not cross unless directed to by the wireless remote control 140. The surf line 165 may be defined by actuating the follow-me button 146 twice to form the direction line 160, the surf line 165 being including the position of the second actuation of the follow-me button 146 and being tangential to the direction line 160.

In embodiments of the invention that include the pivotable rudder 120, preferably the wireless remote control 140 includes a rocker switch 147 wherein left and right movement of the rocker switch 147 results in left and right steering of the towing device 10, respectively. The rocker switch 147 may also take the form of a joystick (not shown).

In preferred embodiments of the invention, at least one additional wireless remote control 150 (FIG. 10) is included for at least one additional rider (not shown). The controller 100 electrically attaches or pairs to one of the wireless remote controls 140,150 until a predetermined period of time has passed since a last command therefrom, such as thirty seconds for example. The controller 100 then engages the next wireless remote control 150,140 to send commands, whereby the rider 20 and the additional riders can alternate use of the towing device 10 in a common area of the body of water 15. A sharing lock/enable switch 149 (FIG. 8) may be included for locking the paring of the controller 100 to one of the wireless remote controls 140,150, until such time as one of the riders 20 is no longer actively utilizing the towing device 10, whereupon he can release the towing device 10 to another of the riders 20 by switching the sharing lock/enable switch 149 to an enable mode.

In use, the rider 20 grasps the handle 119 and uses the wireless remote control 140 to tow the rider 20 into a wave, or to another desired destination. Once the rider 20 releases the handle 119 and rides the wave, the towing device 10 navigates to the rendezvous location 16, preferably by default. Alternately, the rider 20 uses the wireless remote control 140 to steer the towing device 10 back to the rider 20 so that the towing device 10 can tow the rider 20 back out beyond the surf line 165, allowing the rider 20 to return to a desired location without having to paddle through breaking waves, for example. The towing device 10, when the follow-me button 146 is engaged, may optionally navigate at the predetermined safe distance after the rider 20 releases the handle 119, so that the towing device 10 is closer to the rider 20 when needed.

While a particular form of the invention has been illustrated and described, it will be apparent that various modifications can be made without departing from the spirit and scope of the invention. For example, the container 60 may be integrated into the buoyant board 30. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A towing device for a rider on a body of water utilizing a tow rope, the towing device comprising:
    a buoyant platform having a top side, a bottom side, and a peripheral edge that includes at least a rear end and a front end;
    at least one electric motor and prop fixed with the bottom side of the buoyant platform and adapted to propel the buoyant platform on the body of water;
    a container having an internal space and fixed with the buoyant platform and having a lid movable between an open configuration and a closed configuration, the lid when in the closed configuration forming a water-tight seal such that water is inhibited form entering the internal space of the container;
    a controller disposed within the internal space of the container and having at least a power source, a CPU, a non-volatile memory, a volatile memory, a motor driver, and a wireless module for receiving wireless commands from a wireless remote control, the controller adapted to power the at least one electric motor with the motor driver and connected to the at least one electric motor with a plurality of electric cables; and
    a tow rope mount fixed with the buoyant platform proximate the rear end and adapted to engage a proximal end of the tow rope;
    whereby with the rider holding the wireless remote control and engaged with a distal end of the tow rope, commands from the wireless remote control are sent to the wireless module of the controller to control power to the at least one electric motor.

2. The towing device of claim 1 wherein the at least one electric motor includes a port side electric motor and a starboard side electric motor, each laterally mutually adjacent, wherein steering of the towing device is controlled by the controller modulating power to each motor, the wireless remote control having a steering control and adapted to send steering signals from the steering control to the controller to cause the controller to modulating power to each of the electric motors in accordance with the steering signals, wherein when the controller sends more power to the port side electric motor than to the starboard side electric motor the towing device is steered to the right, and when the controller sends more power to the starboard side electric motor than to the port side electric motor the towing device is steered to the left.

3. The towing device of claim 2 wherein the controller includes at least one accelerometer and at least one orientation sensor, the controller adapted to slow the at least one electric motor if the accelerometer detects vertical position fluctuations of over a predetermined value, the controller further adapted to stop the at least one electric motor if the orientation sensor detects that the towing device has capsized.

4. The towing device of claim 2 wherein the controller further includes a location sensor, and wherein the wireless remote control includes a rendezvous position set function, whereby a rendezvous position is saved in the volatile memory of the controller when the rendezvous position set function is actuated, and whereby when the at least one electric motor is commanded to shut off, the controller steers the towing device back to the rendezvous position.

5. The towing device of claim 2 wherein the wireless remote control includes a location sensor, a follow-me function, and is adapted to transmit the location of the wireless remote control to the controller of the towing device, the controller of the towing device adapted to maintain a predetermined safe distance away from the wireless remote control when the follow-me function is actuated on the wireless remote control.

6. The towing device of claim 2 wherein the steering control on the wireless remote control includes a switch wherein left and right movement of the switch results in left and right steering of the towing device, respectively.

7. The towing device of claim 1 wherein a pivotable rudder is fixed with or behind the prop of the at least one electric motor, the pivotable rudder controlled by a steering actuator connected with the controller, the wireless remote control having a steering control and adapted to send steering signals from the steering control to the controller to cause the controller to pivot the rudder in accordance with the steering signals.

8. The towing device of claim 7 wherein the pivotable rudder takes the form of a steerable nozzle and the at least one electric motor takes the form of a jet drive.

9. The towing device of claim 1 wherein at least one additional wireless remote control is included for at least one additional rider, the controller electrically attaching to one of the wireless remote controls until a predetermined period of time has passed since a last command therefrom, the controller engaging a next wireless remote control to send commands, whereby the rider and the additional riders can alternate use of the towing device in a common area of the body of water.

10. The towing device of claim 6 wherein forward or rearward movement of the switch on the wireless remote control is adapted to control a speed of the electric motor of the towing device.

11. A towing device for a rider on a body of water utilizing a tow rope, the towing device comprising:
   a buoyant platform having a top side, a bottom side, and a peripheral edge that includes at least a rear end and a front end;
   at least one electric motor and prop fixed with the bottom side of the buoyant platform and adapted to propel the buoyant platform on the body of water;
   a container having an internal space and fixed with the top side of the buoyant platform and having a lid movable between an open configuration and a closed configuration, the lid when in the closed configuration forming a water-tight seal such that water is inhibited form entering the internal space of the container;
   a controller disposed within the internal space of the container and having at least a power source, a CPU, a non-volatile memory, a volatile memory, a motor driver, and a wireless module for receiving wireless commands from a wireless remote control, the controller adapted to power the at least one electric motor with the motor driver and connected to the at least one electric motor with a plurality of electric cables;
   a tow rope mount fixed with the top side of the buoyant platform proximate the rear end and adapted to engage a proximal end of the tow rope;
   wherein the at least one electric motor includes a port side electric motor and a starboard side electric motor, each laterally mutually adjacent, wherein steering of the towing device is controlled by the controller modulating power to each motor, the wireless remote control having a steering control and adapted to send steering signals from the steering control to the controller to cause the controller to modulating power to each of the electric motors in accordance with the steering signals, wherein when the controller sends more power to the port side electric motor than to the starboard side electric motor the towing device is steered to the right, and when the controller sends more power to the starboard side electric motor than to the port side electric motor the towing device is steered to the left;
   the controller including at least one accelerometer and at least one orientation sensor, the controller adapted to slow the at least one electric motor if the accelerometer detects vertical position fluctuations of over a predetermined value, and the controller further adapted to stop the at least one electric motor if the orientation sensor detects that the towing device has capsized;
   the controller further including a location sensor, and the wireless remote control including a rendezvous position set function, wherein a rendezvous position is saved in the volatile memory of the controller when the rendezvous position set function is actuated, and wherein when the at least one electric motor is commanded to shut off, the controller steers the towing device back to the rendezvous position;
   the wireless remote control including a location sensor, a follow-me function, and adapted to transmit the location of the wireless remote control to the controller of the towing device, the controller of the towing device adapted to maintain a predetermined safe distance away from the wireless remote control when the follow-me function is actuated on the wireless remote control; and
   one or more additional wireless remote controls included for additional riders, the controller electrically attaching to one of the wireless remote controls until a predetermined period of time has passed since a last command therefrom, the controller engaging a next wireless remote control to send commands, whereby the rider and the additional riders can alternate use of the towing device in a common area of the body of water;
   wherein the steering control on the wireless remote control includes a switch, such that left and right movement of the switch results in left and right steering of the towing device, respectively;
   whereby with the rider holding the wireless remote control and engaged with a distal end of the tow rope, commands from the wireless remote control are sent to the wireless module of the controller to control power to the at least one electric motor and steering of the towing device.

12. A towing device for a rider on a body of water utilizing a tow rope, the towing device comprising:
   a buoyant platform having a top side, a bottom side, and a peripheral edge that includes at least a rear end and a front end;
   at least one electric motor and prop fixed with the bottom side of the buoyant platform and adapted to propel the buoyant platform on the body of water;
   a container having an internal space and fixed with the buoyant platform and having a lid movable between an open configuration and a closed configuration, the lid when in the closed configuration forming a water-tight seal such that water is inhibited form entering the internal space of the container;
   a controller disposed within the internal space of the container and having at least a power source, a CPU, a non-volatile memory, a volatile memory, a motor driver, and a wireless module for receiving wireless commands from a wireless remote control, the controller adapted to power the at least one electric motor with the motor driver and connected to the at least one electric motor with a plurality of electric cables;
   a tow rope mount fixed with the buoyant platform proximate the rear end and adapted to engage a proximal end of the tow rope;
   a pivotable rudder fixed with or behind the prop of the at least one electric motor, the pivotable rudder controlled by a steering actuator connected with the controller, the wireless remote control having a steering control and adapted to send steering signals from the steering control to the controller to cause the controller to pivot the rudder in accordance with the steering signals;

the controller including at least one accelerometer and at least one orientation sensor, the controller adapted to slow the at least one electric motor if the accelerometer detects vertical position fluctuations of over a predetermined value, and the controller further adapted to stop the at least one electric motor if the orientation sensor detects that the towing device has capsized;

the controller further including a location sensor, and the wireless remote control including a rendezvous position set function, wherein a rendezvous position is saved in the volatile memory of the controller when the rendezvous position set function is actuated, and wherein when the at least one electric motor is commanded to shut off, the controller steers the towing device back to the rendezvous position;

the wireless remote control including a location sensor, a follow-me function, and adapted to transmit the location of the wireless remote control to the controller of the towing device, the controller of the towing device adapted to maintain a predetermined safe distance away from the wireless remote control when the follow-me function is actuated on the wireless remote control; and one or more additional wireless remote controls included for additional riders, the controller electrically attaching to one of the wireless remote controls until a predetermined period of time has passed since a last command therefrom, the controller engaging a next wireless remote control to send commands, whereby the rider and the additional riders can alternate use of the towing device in a common area of the body of water;

wherein the steering control on the wireless remote control includes a switch, such that left and right movement of the switch results in left and right steering of the towing device, respectively;

whereby with the rider holding the wireless remote control and engaged with a distal end of the tow rope, commands from the wireless remote control are sent to the wireless module of the controller to control power to the at least one electric motor and steering of the towing device.

\* \* \* \* \*